United States Patent
Park et al.

(10) Patent No.: US 9,370,024 B2
(45) Date of Patent: Jun. 14, 2016

(54) METHOD AND APPARATUS FOR RANDOM ACCESS IN WIRELESS COMMUNICATION SYSTEM

(71) Applicant: LG ELECTRONICS INC., Seoul (KR)

(72) Inventors: Sungjun Park, Anyang-si (KR);
Sunghoon Jung, Anyang-si (KR);
Seungjune Yi, Anyang-si (KR);
Youngdae Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 141 days.

(21) Appl. No.: 14/342,727

(22) PCT Filed: Sep. 24, 2012

(86) PCT No.: PCT/KR2012/007642
§ 371 (c)(1),
(2) Date: Mar. 4, 2014

(87) PCT Pub. No.: WO2013/043008
PCT Pub. Date: Mar. 28, 2013

(65) Prior Publication Data
US 2014/0226601 A1 Aug. 14, 2014

Related U.S. Application Data

(60) Provisional application No. 61/538,144, filed on Sep. 23, 2011.

(51) Int. Cl.
*H04W 74/08* (2009.01)
*H04W 72/14* (2009.01)

(52) U.S. Cl.
CPC .......... *H04W 74/0833* (2013.01); *H04W 72/14* (2013.01)

(58) Field of Classification Search
None
See application file for complete search history.

(56) References Cited

U.S. PATENT DOCUMENTS

| | | | |
|---|---|---|---|
| 2009/0323607 A1 | 12/2009 | Park et al. | |
| 2011/0170503 A1 | 7/2011 | Chun et al. | |

(Continued)

FOREIGN PATENT DOCUMENTS

| JP | WO 2011099151 A1 * | 8/2011 | ........ H04W 72/0453 |
|---|---|---|---|
| KR | WO 2008156315 A2 * | 12/2008 | ........ H04W 74/0833 |

(Continued)

OTHER PUBLICATIONS

The Free Dictionary, Estimate-Definition of estimate by the Free Dictionary [online], [retrieved on Nov. 12, 2015], Retrieved from the Internet: <URL: http://www.thefreedictionary.com/estimate>.*

(Continued)

*Primary Examiner* — Omar Ghowrwal
(74) *Attorney, Agent, or Firm* — Lee Hong Degerman Kang & Waimey; Jonathan Kang; Jeffrey Lotspeich

(57) ABSTRACT

The present invention relates to a method for performing a random access, and more specifically, to a method for a terminal performing a random access in a wireless communication system, and comprises the steps of: receiving from a base station a random access preamble index and an indicator related to the random access; and transmitting to the base station a random access preamble that corresponds to the index, wherein the indicator related to the random access indicates what is a radio network temporary identifier (RNTI), which is used for transmitting a physical downlink control channel that indicates a response to the random access.

2 Claims, 12 Drawing Sheets

(56) References Cited

U.S. PATENT DOCUMENTS

| | | | |
|---|---|---|---|
| 2012/0002643 A1* | 1/2012 | Chung | H04J 11/0093 370/331 |
| 2013/0195071 A1* | 8/2013 | Ohta | H04W 72/0453 370/330 |

FOREIGN PATENT DOCUMENTS

| | | | |
|---|---|---|---|
| KR | 10-2009-0043434 | 5/2009 | |
| KR | WO 2010104365 A2 * | 9/2010 | H04J 11/0093 |
| KR | 10-2011-0069834 | 6/2011 | |

OTHER PUBLICATIONS

Wikipedia, Instant messaging [online], [retrieved on Nov. 12, 2015], Retrieved from the Internet: <URL: https://en.wikipedia.org/wiki/Instant_messaging>.*

PCT International Application No. PCT/KR2012/007642, Written Opinion of the International Searching Authority dated Feb. 18, 2013, 32 pages.

PCT International Application No. PCT/KR2012/007642, Written Opinion of the International Searching Authority dated Feb. 18, 2013, 29 pages.

3rd Generation Partnership Project (3GPP), Technical Specification Group Radio Access Network; Evolved Universal Terrestrial Radio Access (E-UTRA); Physical layer procedures (Release 10), 3GPP TS 36.213 V10.2.0, Jun. 2011, pp. 20-23 (Random Access Procedure).

LAN/MAN Standards Committee of the IEEE Computer Society and the IEEE Microwave Theory and Techniques Society, "IEEE Standard for Local and metropolitan area networks, Part 16: Air Interface for Broadband Wireless Access Systems, Amendment 3: Advanced Air Interface," IEEE Std 802.16m™-2011 (Amendment to IEEE Std 802.16™-2009) May 2011, pp. 415-418 (Bandwidth Request).

* cited by examiner

FIG. 2
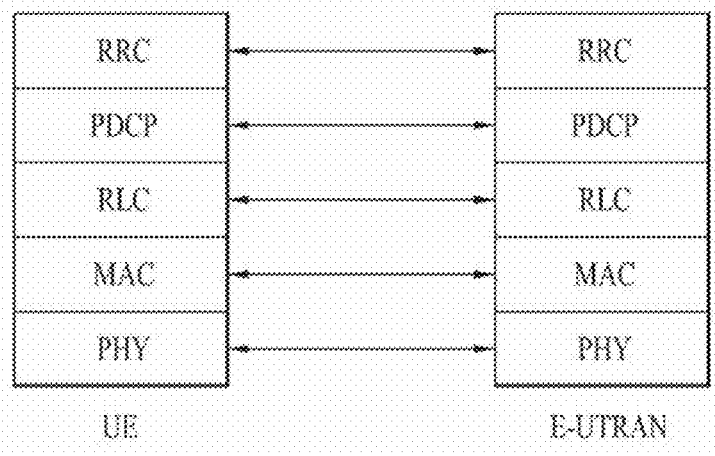
control plane of LTE system radio protocol
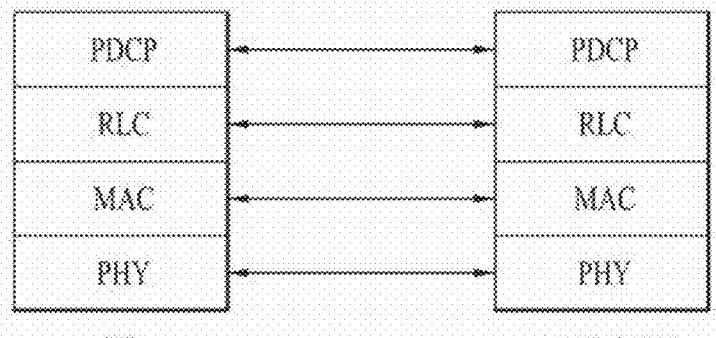
user plane of LTE system radio protocol FIG. 10
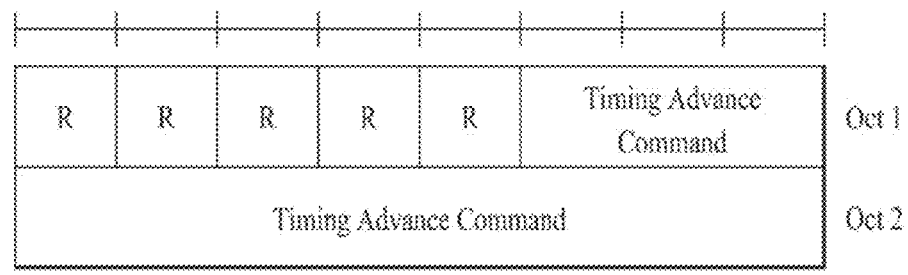
(a)
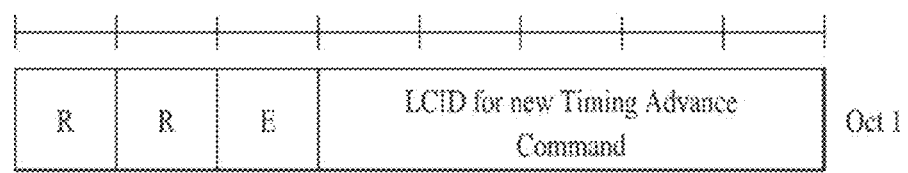
(b)

FIG. 11
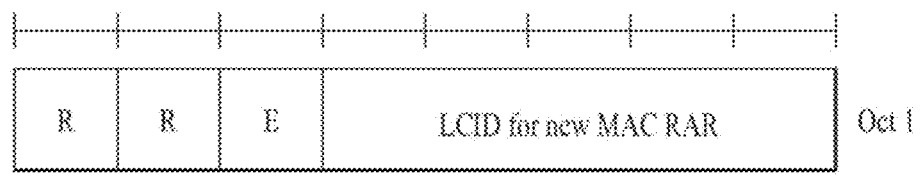
(a)
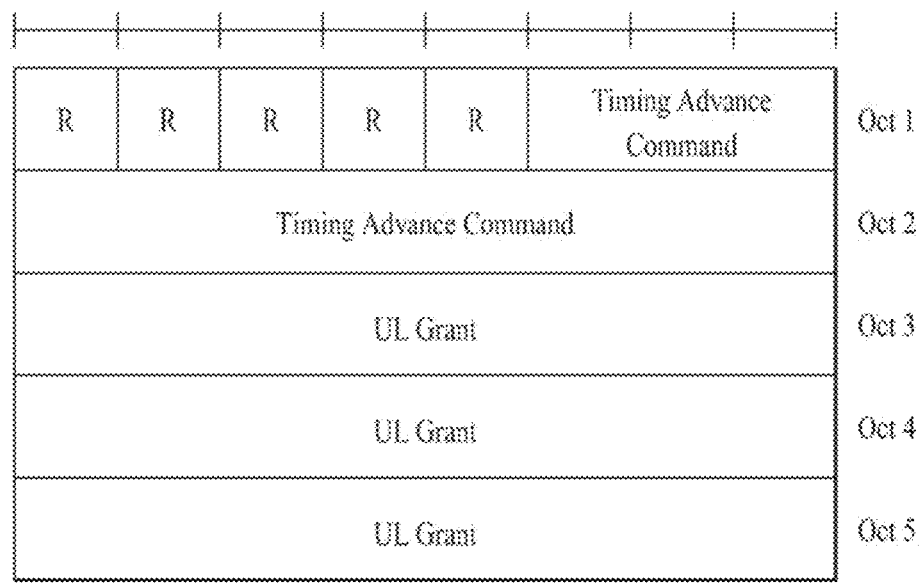
(b)

METHOD AND APPARATUS FOR RANDOM ACCESS IN WIRELESS COMMUNICATION SYSTEM

CROSS-REFERENCE TO RELATED APPLICATIONS

This application is the National Stage filing under 35 U.S.C. 371 of International Application No. PCT/KR2012/007642, filed on Sep. 24, 2012, which claims the benefit of U.S. Provisional Application Ser. No. 61/538,144, filed on Sep. 23, 2011, the contents of which are all hereby incorporated by reference herein in their entirety.

TECHNICAL FIELD

Following description relates to a wireless communication system, and more particularly, to a method of performing a random access and an apparatus therefor.

BACKGROUND ART

A wireless communication system is developing to diversely cover a wide range to provide such a communication service as an audio communication service, a data communication service and the like. In general, the wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system, MC-FDMA (multi carrier frequency division multiple access) system and the like.

DISCLOSURE OF THE INVENTION

Technical Task

A technical task of the present invention is to efficiently support a random access in case of transmitting an instant message and the like.

Technical tasks obtainable from the present invention are non-limited the above-mentioned technical task. And, other unmentioned technical tasks can be clearly understood from the following description by those having ordinary skill in the technical field to which the present invention pertains.

Technical Solution

According to a first technical solution of the present invention, a method of performing a random access, which is performed by a user equipment in a wireless communication system includes the steps of receiving a random access preamble index and an indicator related to the random access from an base station and transmitting a random access preamble corresponding to the random access preable index to the base station, wherein the indicator related to the random access indicates which radio network temporary identifier (RNTI) is used to transmit a physical downlink control channel indicating a random access response.

According to a second technical solution of the present invention, a user equipment device performing a random access in a wireless communication system includes a reception module and a processor, the processor configured to receive a random access preamble index and an indicator related to the random access from an base station, the processor configured to transmit a random access preamble corresponding to the index to the base station, wherein the indicator related to the random access indicates which radio network temporary identifier (RNTI) is used to transmit a physical downlink control channel indicating a random access response.

According to a third technical solution of the present invention, a method of performing a random access, which is performed by a user equipment in a wireless communication system includes the steps of receiving a random access preamble index from an base station and transmitting a random access preamble corresponding to the index to the base station, wherein the user equipment estimates which radio network temporary identifier (RNTI) is used to transmit a physical downlink control channel indicating a random access response from the random access preamble index.

According to a fourth technical solution of the present invention, a user equipment device in a wireless communication system includes a reception module and a processor, the processor configured to receive a random access preamble index from an base station, the processor configured to transmit a random access preamble corresponding to the index to the base station, wherein the user equipment estimates which radio network temporary identifier (RNTI) is used to transmit a physical downlink control channel indicating a random access response from the random access preamble index.

The first and the fourth technical solution may include following descriptions.

The method can further include the step of receiving the random access response transmitted from the base station using the RNTI indicated by the indicator related to the random access.

If the base station transmits the random access preamble index to transmit an instant message, the RNTI may correspond to a Cell-RNTI (C-RNTI). In this case, the random access response may include the instant message. And, the random access response may include a timing advance command value.

The RNTI may correspond to either a C-RNTI or an Random Access-RNTI (RA-RNTI).

The third and the fourth technical solution may include following descriptions.

The random access preamble index may correspond to a prescribed one of a plurality of random access preambles included in at least two random access preamble groups and grouping may be performed for the at least two or more random access preamble groups according to an RNTI. In this case, information on the grouping can be transmitted to the user equipment as system information.

Advantageous Effects

According to the present invention, a random access can be efficiently supported in case of transmitting an instant message and the like. Since an base station can indicate a method of receiving an optimized random access response to a user equipment according to occurrence of an instant messaging packet, the base station can more efficiently allocate an uplink radio resource included in the random access response.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 is a diagram for explaining layers of a radio protocol;

FIG. 10 and FIG. 11 are diagrams for media access control (MAC) control element according to embodiment of the present invention;

BEST MODE

Mode for Invention

Figure 1:
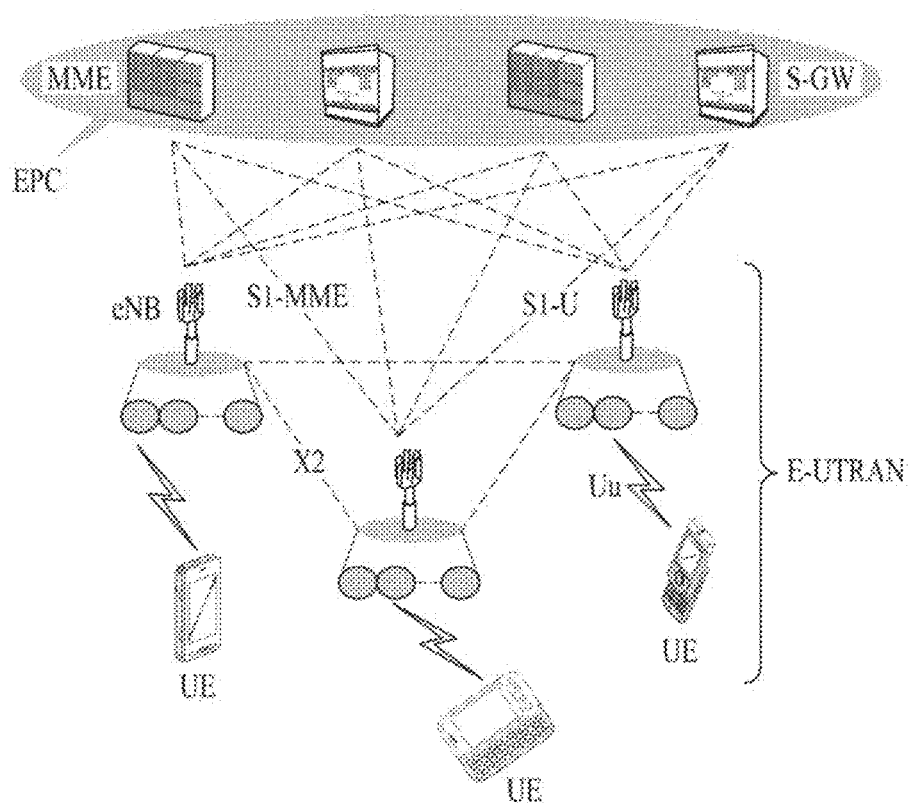
FIG. 1 is a diagram of a schematic structure of LTE system.

The following embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment.

In this specification, embodiments of the present invention are described centering on the data transmission/reception relations between an eNode B and a user equipment. In this case, an eNode B has a meaning of a terminal node of a network directly communicating with a user equipment. In this disclosure, a specific operation explained as performed by an eNode B may be performed by an upper node of the eNode B in some cases.

In particular, in a network constructed with a plurality of network nodes including an eNode B, it is apparent that various operations performed for communication with a user equipment can be performed by an eNode B or other network nodes except the eNode B. 'Base station (BS)' may be substituted with such a terminology as a fixed station, a Node B, an eNode B (eNB), an access point (AP) and the like. A relay may be substituted with such a terminology as a relay node (RN), a relay station (RS), and the like. And, 'terminal' may be substituted with such a terminology as a user equipment (UE), an MS (mobile station), an MSS (mobile subscriber station), an SS (subscriber station), and the like.

Specific terminologies used in the following description are provided to help understand the present invention and the use of the specific terminologies can be modified into a different form in a range of not deviating from the technical idea of the present invention.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Embodiments of the present invention may be supported by the standard documents disclosed in at least one of wireless access systems including IEEE 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may be usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP ($3^{rd}$ Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE and LTE-A standards, by which the technical idea of the present invention may be non-limited.

FIG. 1 is a diagram of a schematic structure of LTE system. Referring to FIG. 1, an LTE system structure is mainly classified into E-UTRAN (evolved UMTS terrestrial radio access network) and EPC (evolved packet core). E-UTRAN consists of a user equipment (hereinafter abbreviated UE) and an evolved Node B (hereinafter abbreviated eNB). An interface between a UE and an eNB is called Uu interface and an interface between eNBs is called X2 interface. EPC consists of an MME (mobility management entity) in charge of a control-plane function and an S-GW (serving gateway) in charge of a user-plane function. An interface between an eNB and an MME is called S1-MME interface and an interface between an eNB and an S-GW is called S1-U interface. The S1-MME interface and the S1-U interface are commonly called S1 interface.

Figure 3:
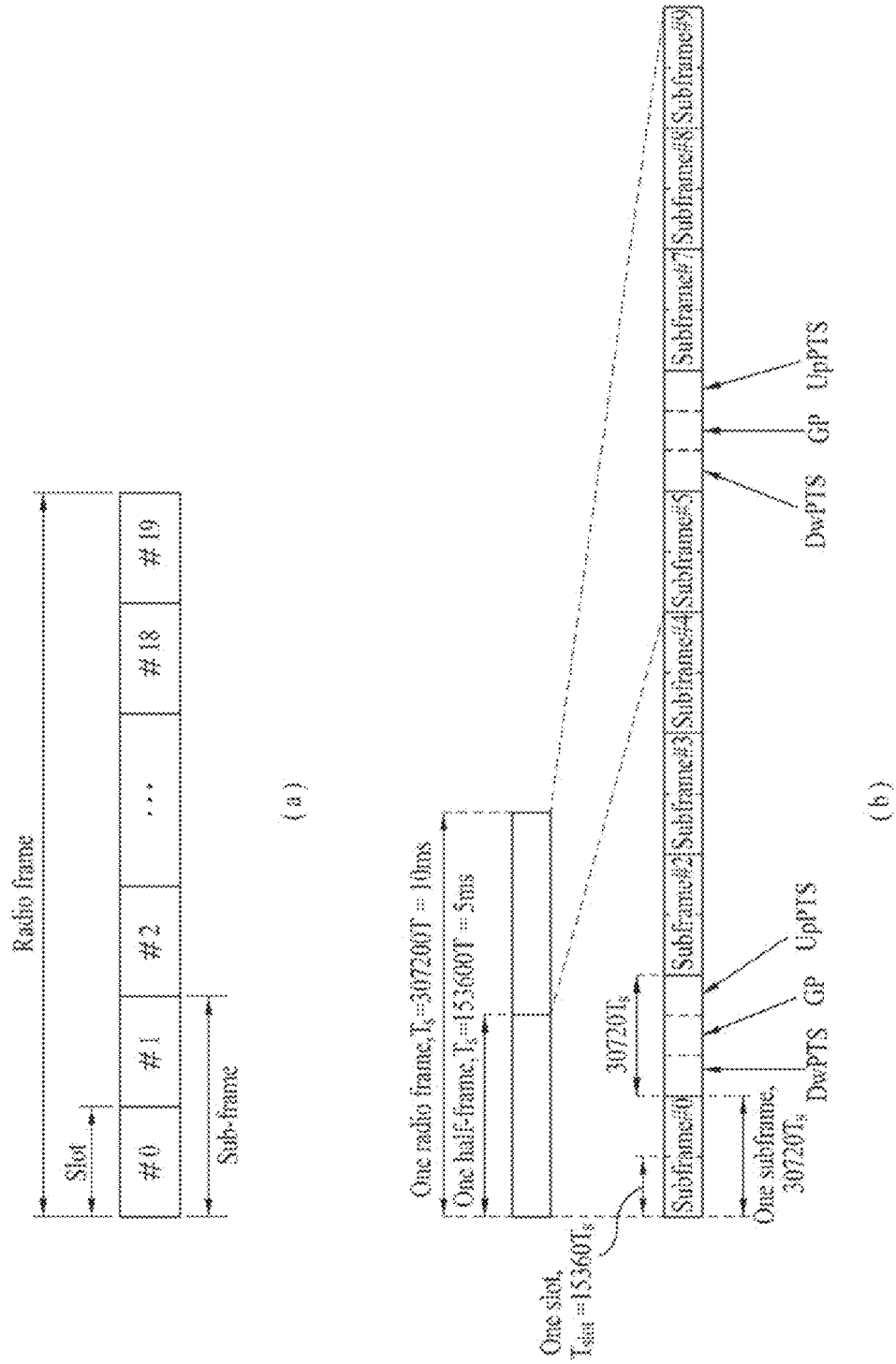
FIG. 3 is a diagram for a structure of a radio frame.

A radio interface protocol is defined in Uu interface which is a radio section. The radio interface protocol horizontally consists of a physical layer, a data link layer, and a network layer. The radio interface protocol is vertically classified into a user plane (U-plane) used for transmitting a user data and a control plane (C-plane) used for delivering a control signal (signaling). As depicted in FIG. 2 and FIG. 3, the radio interface protocol can be classified into a L1 (first layer) including PHY corresponding to a physical layer, a L2 (second layer) including MAC/RLC/PDCP layer, and a L3 (third layer) including an RRC layer based on three lower layers of an open system interconnection (OSI) reference model well-known in a communication system in general. The radio protocol layers exist as pairs in a UE and E-UTRAN and takes charge of transmitting data in Uu interface.

FIG. 2 is a diagram for explaining layers of a radio protocol. As depicted in FIG. 2, there are a control plane and a user plane. Referring to FIG. 2, first of all, a physical layer of the first layer provides an information transfer service to an upper layer using a physical channel. The physical layer is connected to a medium access control (MAC) layer above the physical layer via a transport channel. And, data is transferred between the medium access control layer and the physical layer through the transport channel. In doing so, the transport channels may be mainly classified into a dedicated transport channel and a common transport channel in accordance with whether a channel is shared or not. Data is transferred between different physical layers, and more particularly, between a physical layer of a transmitting side and a physical layer of a receiving side via a physical channel using a radio resource.

In the second layer, various kinds of layers exist. First of all, a medium access control (hereinafter abbreviated MAC) layer plays a role in mapping various logical channels to various transport channels, respectively. And, the MAC layer plays a role as logical channel multiplexing in mapping several logical channels to a single transport channel. The MAC layer is connected to an upper layer (e.g., RLC layer) via a logical channel. And, the logical channel may be mainly classified into a control channel of transporting information of a control plane and a traffic channel of transporting information of a user plane in accordance with a type of the transported information.

A radio link control (hereinafter abbreviated RLC) layer of the second layer plays a role in adjusting a data size to be suitable for a lower layer to transmit data in a radio section by segmentation and concatenation of data received from an upper layer. In order to secure various QoS requested by each radio bearer (hereinafter abbreviated RB), three kinds of operating modes, i.e., TM (transparent mode), UM (un-acknowledged mode) and AM (acknowledged mode) are provided. In particular, the AM RLC performs a retransmission function through ARQ (automatic repeat and request) function for the reliable data transmission.

A PDCP (packet data convergence protocol) layer of the second layer performs a header compression function for reducing an IP packet header size, which is relatively big and carries unnecessary control information, to efficiently transmit such an IP packet as IPv4, IPv6 and the like in a radio section having a narrow bandwidth. This plays a role in increasing transmission efficiency of a radio section by transmitting information mandatory for a header part of data only. Moreover, in LTE system, the PDCP layer also performs a security function that includes ciphering for preventing a data wiretap conducted by a stranger and integrity protection for preventing data manipulation conducted by a stranger.

A radio resource control (hereinafter abbreviated RRC) layer situated at the top of the third layer is defined in a control plane only. The RRC layer is responsible for controlling logical channels, transport channels and physical channels in association with configuration, reconfiguration and release of radio bearers (hereinafter abbreviated RBs). In this case, the RB means a logical path provided by the first and second layer of the radio protocol for the data delivery between the UE and the E-UTRAN. Generally, configuring an RB means to regulate a radio protocol layer and a channel characteristic necessary for providing a specific service and to configure a specific parameter and operating method, respectively. The RB is further divided into an SRB (signaling RB) and a DRB (data RB). The SRB is used as a path for transmitting an RRC message in C-plane and the DRB is used as a path for transmitting user data in U-plane.

A structure of a radio frame is explained with reference to FIG. 3.

In a cellular OFDM radio packet communication system, UL/DL (uplink/downlink) data packet transmission is performed by a unit of subframe and one subframe is defined as a predetermined time interval including a plurality of OFDM symbols. According to 3GPP LTE standard, a type-1 radio frame structure applicable to FDD (frequency division duplex) and a type-2 radio frame structure applicable to TDD (time division duplex) are supported by the 3GPP LTE standard.

FIG. 3 (*a*) is a diagram for a structure of a radio frame of type 1. A DL (downlink) radio frame includes 10 subframes. Each of the subframes includes 2 slots in time domain. Time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDMA in downlink, OFDM symbol is provided to indicate one symbol period. The OFDM symbol may be named SC-FDMA symbol or symbol period. Resource block (RB) is a resource allocation unit and may include a plurality of contiguous subcarriers in one slot.

The number of OFDM symbols included in one slot may vary in accordance with a configuration of cyclic prefix (CP). The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

FIG. 3 (*b*) is a diagram for a structure of a radio frame of type 2. A type-2 radio frame includes 2 half frames. Each of the half frames includes 5 subframes, DwPTS (downlink pilot time slot), GP (guard period) and UpPTS (uplink pilot time slot) and one subframe includes 2 slots. The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multi-path delay of a downlink signal between uplink and downlink. Meanwhile, one subframe includes 2 slots irrespective of a type of a radio frame.

The structure of the radio frame is exemplary only. And, the number of subframes included in a radio frame, the number of slots included in the subframe and the number of symbols included in the slot may be modified in various ways.

Figure 4:
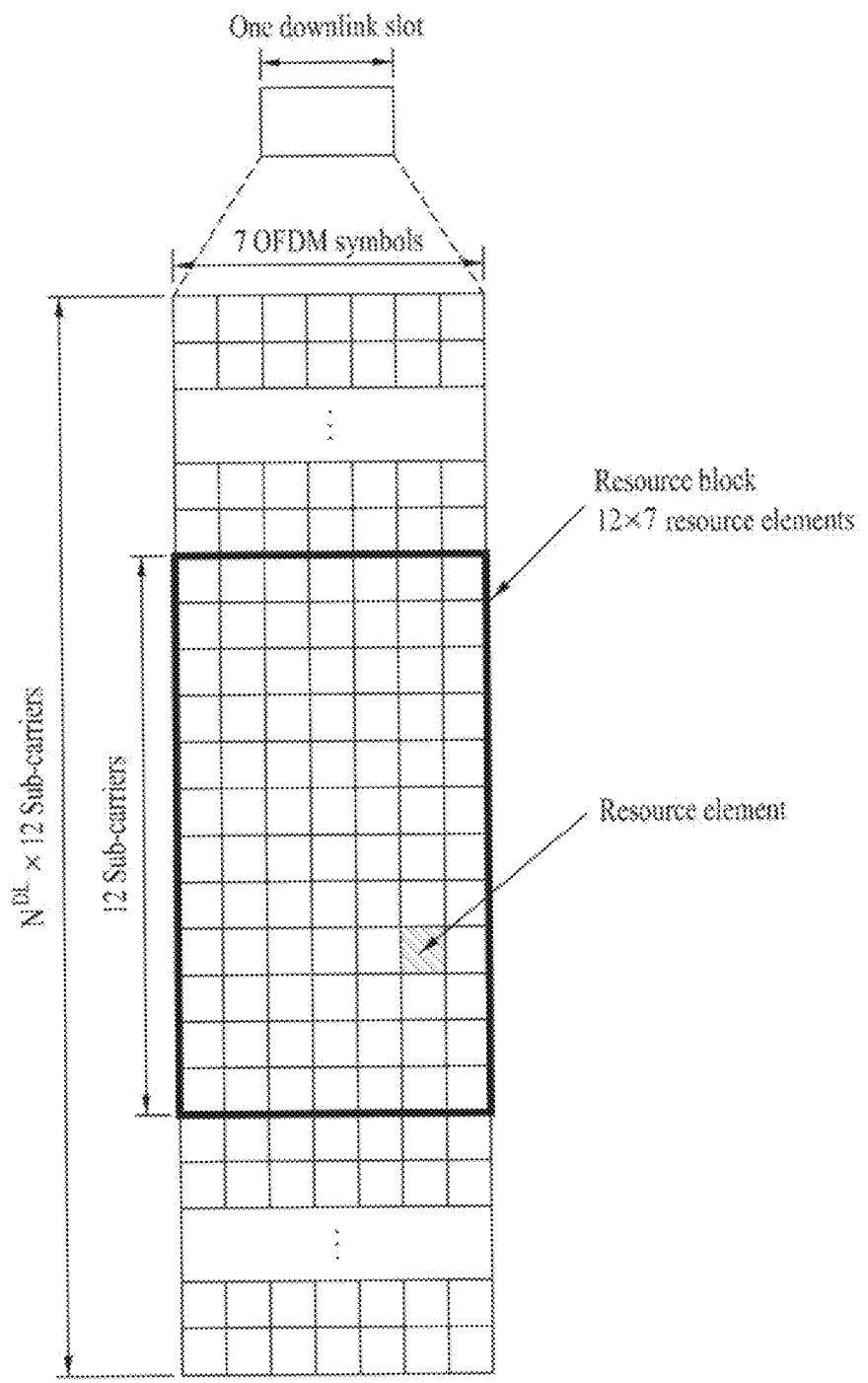
FIG. 4 is a diagram for a resource grid of a downlink slot.

FIG. 4 is a diagram for a resource grid of a downlink slot. Referring to FIG. 4, One DL slot may include 7 OFDM symbols in time domain and one resource block (RB) may include 12 subcarriers in frequency domain, by which the present invention may be non-limited. For instance, in case of a normal CP (cyclic prefix), one slot includes 7 OFDM symbols. Yet, in case of an extended CP (cyclic prefix), one slot may include 6 OFDM symbols. Each element on a resource grid is called a resource element (hereinafter abbreviated RE). One resource block includes 12×7 resource elements. The number $N^{DL}$ of resource blocks included in a DL slot may depend on a DL transmission bandwidth. A structure of an uplink (UL) slot may be identical to that of the DL slot.

Figure 5:
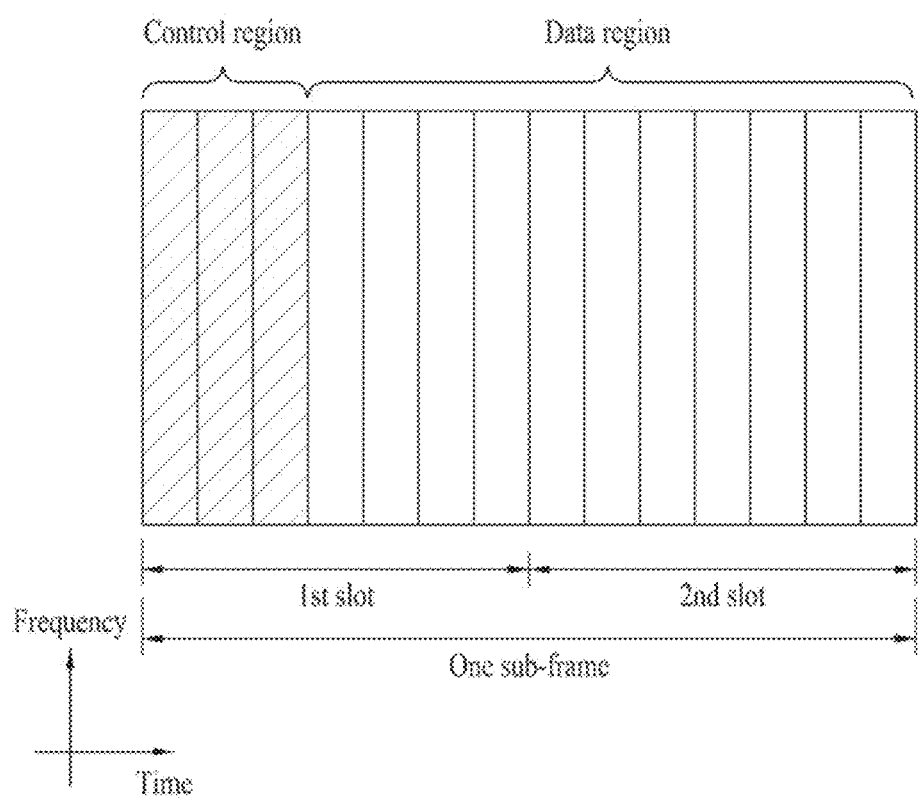
FIG. 5 is a diagram for a structure of a downlink subframe.

FIG. 5 is a diagram for a structure of a downlink subframe. Referring to FIG. 5, maximum 3 OFDM symbols situated in a head part of a first slot of one subframe correspond to a control region to which control channels are assigned. The rest of OFDM symbols correspond to a data region to which PDSCH (physical downlink shared channel) is assigned. Examples of DL control channels used by 3GPP LTE may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and carries information on the number of OFDM symbols used for a transmission of a control channel within the subframe. The PHICH carries HARQ ACK/NACK (hybrid automatic repeat request acknowledgement/non-acknowledgement) signal in response to an uplink transmission. Control information transmitted on the PDCCH is called DCI (downlink control information). The DCI includes UL/DL scheduling information or a UL transmit power control command for a random UE group. The PDCCH carries a transmission format of downlink shared channel (DL-SCH) and resource allocation information, the transmission format of uplink shared channel (DL-SCH) and resource allocation information, paging information on a paging channel (PCH), system information on the DL-SCH, resource allocation information of such an upper layer control message as a random access response transmitted on PDSCH, a set of Tx power control command for each of the user equipments in a random UE group, a Tx power control command, activation of VoIP (voice over IP) and the like. A plurality of PDCCHs can be transmitted in a control region and a user equipment is able to monitor a plurality of the PDCCHs. PDCCH is configured with the aggregation of at least one or more contiguous CCEs (control channel elements). CCE is a logical assignment unit used to provide PDCCH with a code rate in accordance with a state of a radio channel. CCE corresponds to a plurality of REGs (resource element groups). A format of PDCCH and the number of bits of an available PDCCH are determined depending on correlation between the number of CCEs and a code rate provided by the CCEs. An eNB determines a PDCCH format in accordance with DCI transmitted to a user equipment and attaches CRC (hereinafter abbreviated cyclic redundancy check) to control information. The CRC is masked with an identifier called a radio network temporary identifier (hereinafter abbreviated RNTI) in accordance with an owner or usage of PDCCH. If the PDCCH is provided for a specific user equipment, the CRC can be masked with a unique identifier of the user equipment, i.e., C-RNTI (i.e., Cell-RNTI). If the PDCCH is provided for a paging message, the CRC can be masked with a paging indication identifier (e.g., P-RNTI (Paging-RNTI)). If the PDCCH is provided for system information, and more particularly, for system information block (SIB), the CRC can be masked with a system information identifier (e.g., SI-RNTI (system information-RNTI). In order to indicate a random access response, which is a response to a transmission of a random access preamble of a user equipment, CRC can be masked with RA-RNTI (random access-RNTI).

Figure 6:
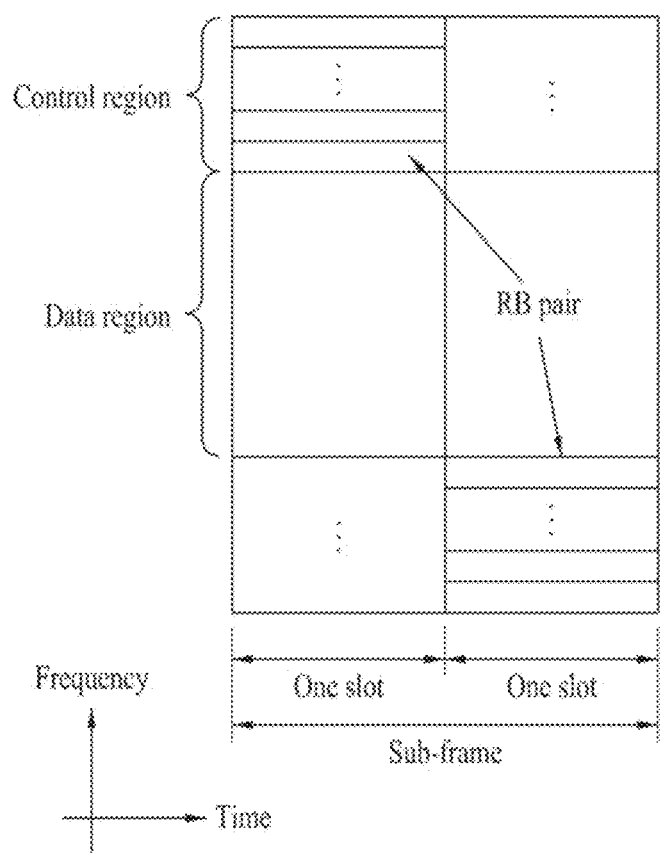
FIG. 6 is a diagram for a structure of an uplink subframe.

FIG. 6 is a diagram for a structure of an uplink subframe. Referring to FIG. 6, a UL subframe may be divided into a control region and a data region in frequency domain. A physical UL control channel (PUCCH), which includes UL control information, is assigned to the control region. And, a physical UL shared channel (PUSCH), which includes user data, is assigned to the data region. In order to maintain single carrier property, one user equipment does not transmit PUCCH and PUSCH simultaneously. PUCCH for one user equipment is assigned to a resource block pair (RB pair) in a subframe. Resource blocks belonging to the resource block (RB) pair may occupy different subcarriers in each of 2 slots. Namely, a resource block pair allocated to PUCCH is frequency-hopped on a slot boundary.

In the following description, a random access procedure performed in LTE system is explained with reference to FIG. 7 to FIG. 8.

In LTE system, a user equipment may perform the random access procedure in one of the following cases.

In case that a user equipment performs an initial access since the user equipment has no connection (RRC connection) with an eNB In case that a user equipment initially accesses a target cell in a handover procedure In case that a random access procedure is requested by a command of an eNB In a situation that time synchronization of uplink is not matched or that a designated radio resource used to request a radio resource is not allocated, data in uplink is generated In case of a recovery procedure when a radio link failure or a handover failure occurs LTE system provides a non-contention random access procedure in a manner that an eNB allocates a dedicated random access preamble to a specific user equipment and the user equipment performs a random access procedure with the random access preamble. In other word, in selecting a random access preamble, there are a contention-based random access procedure using a random access preamble randomly selected by a user equipment in a specific set and a non-contention based random access procedure using a random access preamble allocated to the specific user equipment only. Difference between the aforementioned two random access procedures is whether a collision problem due to a contention occurs. The non-contention based random access procedure can be used when the non-contention based random access procedure is requested by the aforementioned handover procedure or the command of the eNB only.

Figure 7:
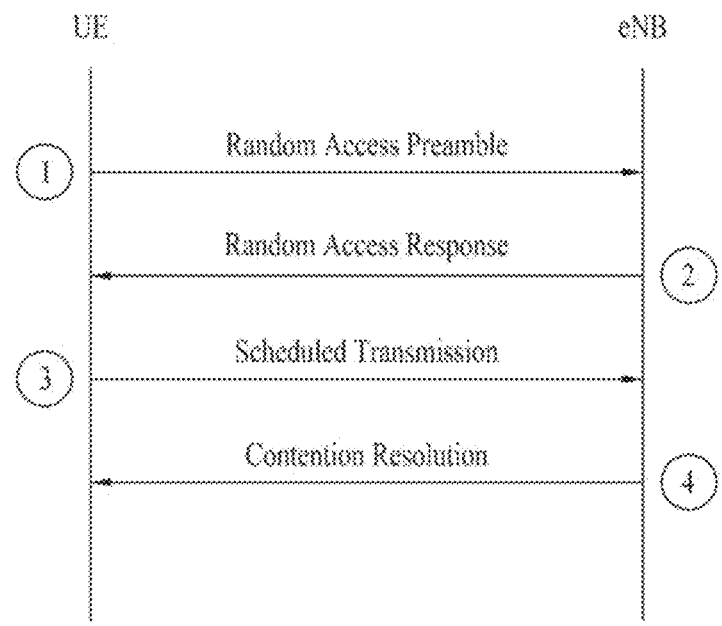
FIG. 7 is a diagram for explaining a contention based random access procedure.

FIG. 7 is a diagram for explaining a contention based random access procedure.

In a contention-based random access, a user equipment randomly selects a random access preamble from a set of random access preambles indicated by system information or a handover command, selects a PRACH (physical RACH)

resource capable of carrying the random access preamble, and then transmits the random access preamble via the selected PRACH resource.

Having transmitted the random access preamble, the user equipment attempts a reception of a random access response of the user equipment in a random access response receiving window indicated by an eNB through the system information or the handover command. More specifically, the random access response information may be transmitted in a format of MAC PDU and the MAC PDU may be carried on PDSCH (physical downlink shared channel). In order for the user equipment to appropriately receive the information carried on the PDSCH, PDCCH is delivered as well. In particular, information on the user equipment required to receive the PDSCH, a frequency and time information of a radio resource of the PDSCH, a transmission format of the PDSCH and the like may be preferably included in the PDCCH. Once the user equipment succeeds in the reception of the PDCCH transmitted to the user equipment, it may be able to appropriately receive a random access response carried on the PDSCH in accordance with the informations of the PDCCH. And, a random access preamble identifier (ID), a UL grant (UL radio resource), a temporary cell identifier (temporary C-RNTI), time alignment command (hereinafter abbreviated TAC) (time synchronization correction value) and the like can be included in the random access response. As mentioned in the foregoing description, the random access preamble identifier is required for the random access response. Since random access response information for at least one or more user equipments may be included in one random access preamble, it is necessary to indicate that the UL grant, the temporary C-RNTI, and the TAC are valid for which user equipment. The random access preamble identifier is matched with the random access preamble selected by the user equipment in a first process.

Having received the random access response valid for the user equipment, the user equipment processes informations included in the random access response, respectively. In particular, the user equipment applies the TAC and saves the temporary C-RNTI. Moreover, the user equipment transmits the data stored in a buffer of the user equipment or a newly generated data to the eNB using the UL grant. In this case, data included in the UL grant should mandatorily include an identifier of the user equipment. This is because, since an eNB is unable to determine which user equipments perform the random access procedure in the contention-based random access procedure, it is necessary for the eNB to identify a user equipment to resolve future contention. As a method of including an identifier of the user equipment, two kinds of methods have been discussed. According to a first method, if the user equipment has a valid cell identifier allocated by a corresponding cell prior to the random access procedure, the user equipment transmits the cell identifier of the user equipment via the UL grant. On the contrary, if the user equipment fails to receive a valid cell identifier prior to the random access procedure, the user equipment transmits a unique identifier (e.g., S-TMSI or random ID) of the user equipment. In general, the unique identifier is longer than the cell identifier. In case that the user equipment has transmitted data via the UL grant, the user equipment initiates a timer (contention resolution timer) to resolve a contention.

Having transmitted the data including the identifier of the user equipment via the UL grant included in the random access response, the user equipment waits for an instruction of the eNB for the contention resolution. In particular, the user equipment attempts a reception of PDCCH to receive a specific message. As a method of receiving the PDCCH, two kinds of methods have been discussed. As mentioned in the foregoing description, if the identifier of the user equipment transmitted via the UL grant corresponds to a cell identifier, the user equipment attempts a reception of the PDCCH using the cell identifier of the user equipment. If the identifier corresponds to a unique identifier, the user equipment attempts a reception of the PDCCH using the temporary C-RNTI included in the random access response. Thereafter, in a former case, if the PDCCH is received via the cell identifier of the user equipment before the contention resolution timer expires, the user equipment determines that the random access procedure is normally performed and then ends the random access procedure. In a latter case, if PDCCH is received via the temporary cell identifier before the contention resolution timer expires, the user equipment checks data carried on PDSCH indicated by the PDCCH. If the unique identifier of the user equipment is included in content of the data, the user equipment determines that the random access procedure is normally performed and then ends the random access procedure.

Figure 8:
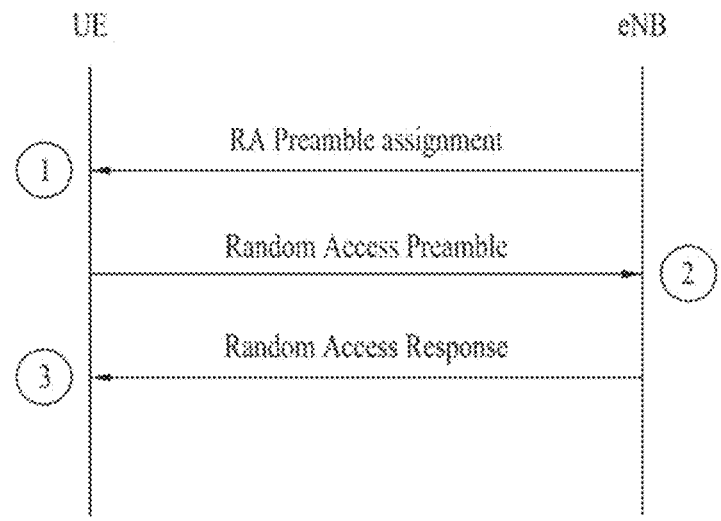
FIG. 8 is a diagram for explaining a non-contention based random access procedure.

FIG. 8 is a diagram for explaining a non-contention based random access procedure. Unlike the contention-based random access procedure, if random access response information is received, a user equipment determines that a random access procedure is normally performed and then ends the random access procedure in the non-contention based random access procedure. The non-contention based random access procedure can be performed in case that a handover procedure is performed or the non-contention based random access procedure is requested by a command of the eNB. Of course, the non-contention based random access procedure can be performed by the both of the aforementioned cases. First of all, in order to perform the non-contention based random access procedure, it is important to receive a dedicated random access preamble, which has no possibility of collision, from the eNB. As a method of being indicated by the dedicated random access preamble, there exist a handover command and a PDCCH command. After the random access preamble dedicated to the user equipment only is received from the eNB, the user equipment transmits the preamble to the eNB.

In the following description, a method of performing a random access in case of transmitting an instant message is explained based on the aforementioned contents. For reference, unless it is particularly mentioned, the contents mentioned earlier in the random access procedure in LTE/LTE-A system can be included in the following description as a reference/configuration.

An instant message is briefly explained. A characteristic of a packet occurring in an instant message service is described. The packet is configured by a small size (e.g., average 100 bytes in UL and 300 bytes in DL). Difference in time of occurring between packets is variously distributed between 2 seconds and 2 minutes and may have an average value of 10 to 15 seconds. As mentioned in the foregoing description, in case of the instant messaging service, since occurrence interval between packets is significantly various, an eNB can release an RRC connection of a user equipment after completing a transmission or reception of an instant messaging packet to/from the user equipment. Yet, in this case, if a next packet occurs, since it is necessary to establish an RRC connection between the eNB and the user equipment, a signaling overhead to establish the RRC connection may increase.

In order to supplement this, the eNB can maintain the RRC connection after a packet is transceived with the user equipment. Yet, in order for the user equipment to maintain the RRC connection and UL time synchronization, the user equipment should periodically transmit such a control signal as a DL channel status report or an UL channel status report to the eNB. Hence, this may increase power consumption of the user equipment.

Hence, although the user equipment maintains the RRC connection, the eNB can enable the user equipment not to maintain the UL time synchronization after a packet transmission is completed. Yet, in this case, if a next packet occurs, it is necessary for the user equipment to perform an UL time synchronization process. If a DL instant messaging packet occurs, a random access procedure should be performed in order for the eNB to transmit the DL instant messaging packet to a user equipment in which the UL time synchronization is not performed. Hence, there may exist a problem of time delay and a signaling overhead resulted from performing the random access procedure. Hence, according to embodiment of the present invention described in the following, the eNB transmits an indicator indicating a method of receiving a random access response message to the user equipment and the user equipment can receive the random access response message according to the method indicated by the indicator after transmitting a random access preamble to the eNB. By doing so, the time delay and the overhead, which may occur in case of using a legacy random access procedure only, can be reduced.

Figure 9:
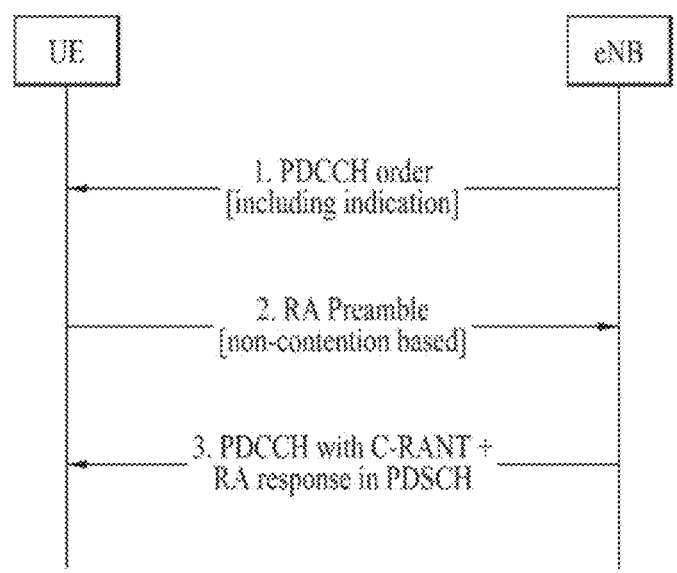
FIG. 9 is a diagram for explaining a random access procedure according to embodiment of the present invention.

FIG. 9 is a diagram for explaining a random access procedure according to embodiment of the present invention. Referring to FIG. 9, a UE receives a random access preamble index from an eNB via a PDCCH order. In this case, the eNB can transmit an indicator indicating a method of receiving a random access response message to the UE together with the random access preamble index. In this case, the indicator indicating the method of receiving the random access response message may correspond to an indicator indicating which radio network temporary identifier (RNTI) is used to transmit PDCCH for indicating a random access response. More specifically, in case of receiving the random access response message, the indicator indicates whether the UE uses PDCCH masked with C-RNTI of the UE, PDCCH masked with a legacy RA-RNTI, or the like. The aforementioned two kinds of receiving methods, i.e., C-RNTI and RA-RNTI are just examples, by which embodiment of the present invention may be non-limited. Moreover, the C-RNTI may be related to a transmission of an instant message packet and the RA-RNTI may be related to a transmission of a different packet instead of the instant message packet.

Referring to FIG. 9, having received the PDCCH order from the eNB, the UE transmits the allocated random access preamble to the eNB. Specifically, the UE selects the random access preamble corresponding to the random access preamble index, which is received together with the PDCCH order from the eNB, and transmits it to the eNB.

The eNB transmits a random access response to the UE in response to the random access preamble transmitted by the UE. In this case, the random access response is transmitted on PDSCH. Information on a transmission area of the PDSCH and the like is transmitted on the PDCCH. In this case, an RNTI required to receive the PDCCH may correspond to the RNTI indicated by the indicator, which is transmitted by the eNB together with the PDCCH order. In particular, the eNB transmits the PDCCH indicating the random access response in a manner of masking the PDCCH with the RNTI corresponding to the indicator, which is transmitted together with the random access preamble index. By doing so, the UE can immediately receive the random access response using the RNTI indicated by the indicator, which is received together with the PDCCH order.

The aforementioned contents can be explained in relation to the random access procedure related to the instant message transmission as follows.

If an instant message should be transmitted to the UE, i.e., if an instant message packet is arrived at a buffer, the eNB transmits the PDCCH order to the UE together with an indicator indicating C-RNTI. The UE transmits the random access preamble corresponding to the random access preamble index included in the PDCCH order to the eNB. The eNB transmits the random access response. In this case, the PDCCH indicating the random access response is masked with the C-RNTI. When the random access response is received, since the UE has already known that the random access response should be received using the C-RNTI by the indicator, the UE can receive the random access response using the C-RNTI. Moreover, when the random access response is transmitted to the UE, the eNB transmits the instant message, which is to be transmitted to the UE, to the UE together with the random access response, thereby reducing the process of transmitting the instant message after the random access procedure is performed.

And, the random access response message, which is received by the UE using the PDCCH masked with the C-RNTI, may include a timing advance command (TAC) value. The timing advance command value may have a form different from a legacy timing advance command MAC CE (control element). The legacy TAC MAC CE has two values, i.e., an absolute value of 1 byte used for the random access preamble response and a relative value of 11-bit not used for the random access preamble response. As depicted in FIG. 10 (*a*), the TAC MAC CE according to embodiment of the present invention can be configured with 2 bytes to include a TAC of 11-bit, which indicates an absolute value. If the TAC MAC CE is configured as depicted in FIG. 10 (*a*), a logical channel identifier (LCID) corresponding to the TAC MAC CE can be configured as an example depicted in FIG. 10 (*b*). Having received the timing advance command value, the UE determines that the random access response message is successfully completed and may be then able to end the corresponding random access procedure.

And, a UL grant included in the random access response can indicate a variable PUSCH timing. Specifically, the UL grant may further include k value equal to or greater than 6, which is a value applied in a legacy PUSCH timing. If the k value is greater than 10, the UE can transmit PUSCH in a subframe n+10 (in case of FDD). If the aforementioned new TAC and the UL grant are included, a MAC RAR (MAC random access response) can be configured as an example depicted in FIG. 11 (*a*) and an LCID corresponding to the MAC RAR can be configured as an example depicted in FIG. 11 (*b*).

Although the aforementioned explanation has been described in a manner that the indicator is transmitted together with the PDCCH order, the eNB may transmit the indicator to a specific UE using an RRC signal, a MAC signal, or a PDCCH signal.

Or, the eNB may broadcast the indicator within a cell in a manner of including the indicator in system information. If the indicator is included in the system information and broadcasted within the cell, the eNB can add additional information in the following to the system information. The additional information includes grouping information of a non-contention based random access preamble. The grouping information of the non-contention based random access preamble and a transmission form of the random access response message are mapped to each other. In particular, the UE can determine how the random access response message is received using which receiving method via the indicator indicating the transmission form of the random access response message and the grouping information of the non-contention based random access preamble depending on the non-contention based random access preamble transmitted by a prescribed group.

For instance, the non-contention based random access preambles can be divided into two groups (e.g. group A and B). The group A may be mapped to a method of receiving the random access response message using the PDCCH masked with C-RNTI of the UE and the group B may be mapped to a method of receiving the random access response message using the PDCCH masked with RA-RNTI. In this case, if the eNB allocates a non-contention based random access preamble included in the group A to the UE, the UE can receive the random access response message using the PDCCH masked with the C-RNTI of the UE after transmitting the random access preamble of the UE.

Figure 12:
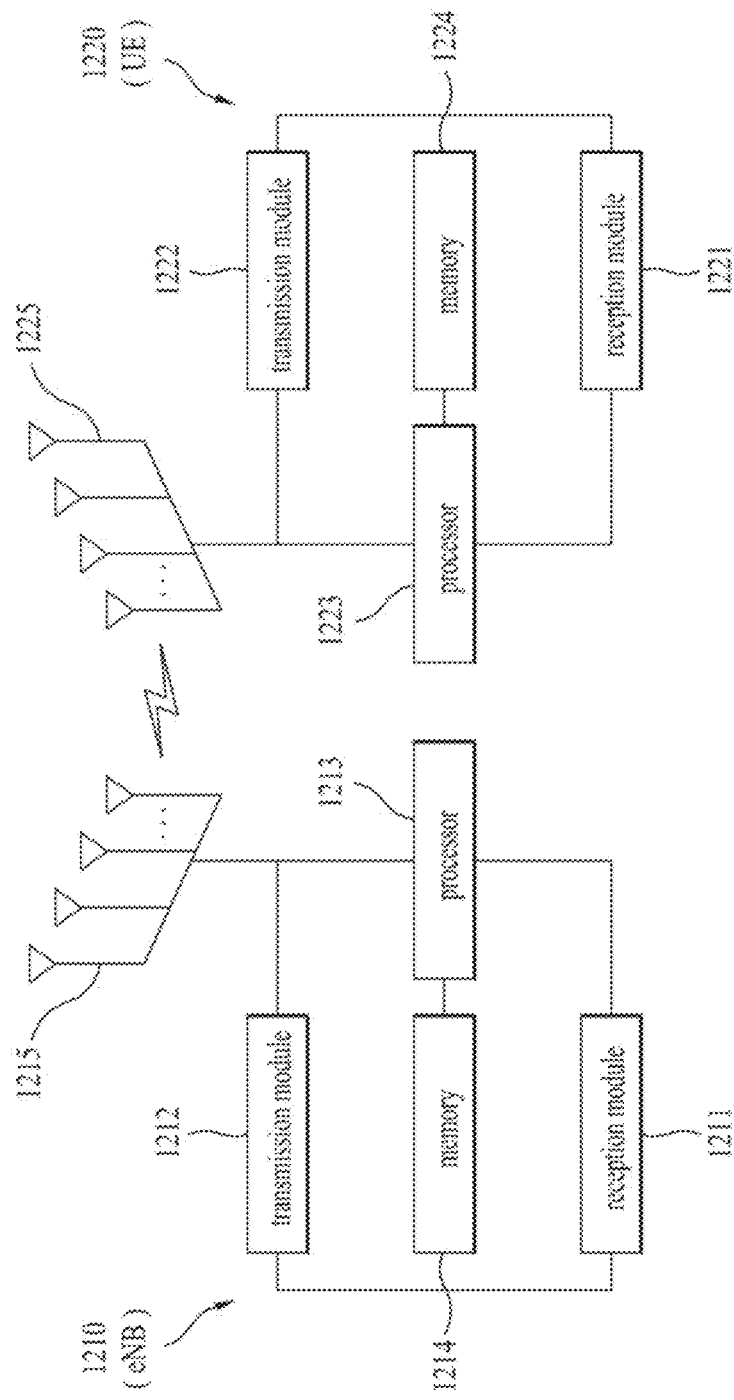
FIG. 12 is a diagram for a configuration of a transceiving device according to embodiment of the present invention.

FIG. 12 is a diagram for a configuration of a transceiving device according to embodiment of the present invention.

Referring to FIG. 12, an eNB device 1210 according to the present invention may include a reception module 1211, a transmission module 1212, a processor 1213, a memory 1214, and a plurality of antennas 1215. A plurality of the antennas 1215 means the eNB device capable of supporting MIMO transmission and reception. The reception module 1211 can receive various signals, a data, and information in UL from the UE. The transmission module 1212 can transmit various signals, a data, and information in DL to the UE. The processor 1213 can control overall operations of the eNB device 1210.

The processor 1213 of the eNB device 1210 according to one embodiment of the present invention may make the aforementioned embodiments operable. Besides, the processor 1213 of the eNB device 1210 is configured to perform a function of processing information received by the eNB device 1210, information to be transmitted to an external, and the like. The memory 1214 is configured to store the processed information for a prescribed time and can be substituted with such a configuration element as a buffer (not depicted), or the like.

Subsequently, referring to FIG. 12, the UE device 1220 according to the present invention includes a reception module 1221, a transmission module 1222, a processor 1223, a memory 1224, and a plurality of antennas 1225. A plurality of the antennas 1225 means the UE device capable of supporting MIMO transmission and reception. The reception module 1221 can receive various signals, a data, and information in DL from the eNB. The transmission module 1222 can transmit various signals, a data, and information in UL to the eNB. The processor 1223 can control overall operations of the UE device 1220.

The processor 1223 of the UE device 1220 according to one embodiment of the present invention may make the aforementioned embodiments operable. Besides, the processor 1223 of the UE device 1220 is configured to perform a function of processing information received by the UE device 1220, information to be transmitted to an external, and the like. The memory 1224 is configured to store the processed information for a prescribed time and can be substituted by such a configuration element as a buffer (not depicted), or the like.

Detail configuration of the eNB device and the UE device can be implemented to independently apply the aforementioned contents explained in various embodiments of the present invention or to simultaneously apply two or more embodiments. The overlapped contents are omitted for clarity of explanation.

And, in explaining FIG. 12, explanation on the eNB device 1210 can be identically applied to a relay device as a main agent of DL transmission or a main agent of UL reception. Explanation on the UE device 1220 can be identically applied to a relay device as a main agent of DL reception or a main agent of UL transmission.

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

INDUSTRIAL APPLICABILITY

The aforementioned embodiments of the present invention may be applied to various mobile communication systems.

What is claimed is:

1. A method of performing a random access by a user equipment in a wireless communication system, comprising:
receiving system information which is broadcasted by a base station, wherein the system information includes grouping information indicating a mapping between a plurality of random access preamble groups and a plurality of RNTIs (Radio Network Temporary Identifiers) to be used to receive a random access response;

receiving, from the base station, a random access preamble index for an instant message, wherein the random access preamble index belongs to a random access preamble group which is mapped to a (Cell-Radio Network Temporary Identifier);

transmitting, to the base station, a random access preamble corresponding to the random access preamble index; and receiving, from the base station, the random access response and the instant message by using the C-RNTI mapped to the random access preamble index, wherein the random access response comprises a TAC value in a form of a TAC MAC CE, and the TAC MAC CE is configured with 2 bytes and represents an absolute value of 11-bits.

2. A user equipment device in a wireless communication system, comprising a transmission module;
a reception module; and
a processor,
wherein the processor is configured to control the reception module to receive system information which is broadcasted by a base station, wherein the system information includes grouping information indicating a mapping between a plurality of random access preamble groups and a plurality of RNTIs (Radio Network Temporary Identifiers) to be used to receive a random access response, to control the reception module to receive from the base station a random access preamble index for an instant message, wherein the random access preamble index belongs to a random access preamble group which is mapped to a C-RNTI (Cell-Radio Network Temporary Identifier), to control the transmission module to transmit to the base station a random access preamble corresponding to the random access preamble index, and to control the reception module to receive from the base station the random access response and the instant message by using the C-RNTI mapped to the random access preamble index, and wherein the random access response comprises a TAC value in a form of a TAC MAC CE, and the TAC MAC CE is configured with 2 bytes and represents an absolute value of 11-bits.

* * * * *